United States Patent
Baie et al.

(10) Patent No.: US 7,078,003 B2
(45) Date of Patent: Jul. 18, 2006

(54) DEVICE FOR THE TRANSFER OF ENERGY AND/OR MATTER BETWEEN A SOLUBLE SOLID AND A LIQUID

(75) Inventors: Jean Baie, Linkebeek (BE); Fédérico Lopez, Madrid (ES); Etienne Le Clef, Wezembeek-Oppem (BE)

(73) Assignee: De Smet Engineering naamloze vennootschap, Zaventem (BE)

( * ) Notice: Subject to any disclaimer, the term of this patent is extended or adjusted under 35 U.S.C. 154(b) by 700 days.

(21) Appl. No.: 10/203,641

(22) PCT Filed: Feb. 22, 2001

(86) PCT No.: PCT/BE01/00026

§ 371 (c)(1),
(2), (4) Date: Aug. 22, 2002

(87) PCT Pub. No.: WO01/62361

PCT Pub. Date: Aug. 30, 2001

(65) Prior Publication Data

US 2003/0012713 A1      Jan. 16, 2003

(30) Foreign Application Priority Data

Feb. 24, 2000   (BE) ................................ 2000/0147

(51) Int. Cl.
  *B01D 11/04*  (2006.01)
  *B08B 3/00*   (2006.01)
  *F28D 11/08*  (2006.01)
  *B01F 11/00*  (2006.01)
  *B01J 3/00*   (2006.01)

(52) U.S. Cl. .................... 422/261; 422/266; 422/273; 422/276; 422/287; 422/292; 422/300; 134/132; 134/65; 134/69; 134/169; 68/58; 165/88; 165/111; 165/109.1; 366/219; 366/234; 366/235; 127/1; 127/2; 127/6; 127/36; 127/42; 127/43; 127/45; 99/485; 99/511

(58) Field of Classification Search ................ 422/261, 422/266–273, 276–277, 287, 292, 30; 134/132, 134/65, 69, 169; 68/58; 165/88, 111, 109.1; 366/219, 234, 235; 127/1–2, 6, 36, 42–43, 127/45; 99/485, 511; 210/189, 150, 372, 210/404, 3
See application file for complete search history.

(56) References Cited

U.S. PATENT DOCUMENTS 4,289,734 A * 9/1981 Longuet .................... 422/272

FOREIGN PATENT DOCUMENTS

| EP | 0 027 396 A | 4/1981 |
| EP | 0 168 371 A | 1/1986 |
| FR | 40 047 E | 3/1932 |

* cited by examiner

*Primary Examiner*—Gladys J P Corcoran
*Assistant Examiner*—Monzer R. Chorbaji
(74) *Attorney, Agent, or Firm*—Bacon & Thomas PLLC (57) ABSTRACT

The invention relates to a device for the transfer between a solid matter and a liquid, comprising an outer drum and a perforated inner drum, means for commonly rotating the drums, and means situated inside the inner drum for moving the solid matter. In between the two drums, a number of troughs are formed which, during the rotation of the drums, bring up liquid and pour it out higher up through the inner drum. Along the front rim of each trough, the drum is provided with a drain opening, opposite to which means are provided for preventing, when the drain opening, during the rotation of the drums, is at the bottom, the penetration of solid matter through said opening.

10 Claims, 6 Drawing Sheets

DEVICE FOR THE TRANSFER OF ENERGY AND/OR MATTER BETWEEN A SOLUBLE SOLID AND A LIQUID

This invention relates to a device for the transfer, between a solid matter and a liquid, of energy and/or matter dissolvable in the liquid, which device comprises an outer drum mounted in lying position, an inner drum which is provided with perforations and which is situated coaxially in the outer drum and is connected to this latter, means for commonly rotating the two drums, and means situated inside the inner drum for moving the solid matter from a supply at one extremity of said drum to an outlet at its other extremity, whereby in between the two drums a number of troughs are formed which, during the rotation of the drums, scoop up liquid from beneath between the drums and bring it upward and further up pour out said liquid through the inner drum onto the solid matter inside the inner drum.

Such devices are used, amongst others, for extracting sugar, starch, oils, fats or other dissolvable components from a vegetable solid matter which is crushed, ground, cut into pieces or divested of fibers.

Such device is described in the European patent application No. 0.168.371. The two drums are connected to each other by a screw blade. Between adjacent turns of said screw blade, partitions are provided which are directed at an angle in respect to a radial plane and which, together with the turns and the outer drum, form a series of troughs.

Liquid which is flowing downward through the solid matter and either takes up or releases matter therefrom or energy thereof, is penetrating at the bottom through the perforated inner drum and is collected in the troughs situated beneath which gradually are filled with liquid.

As a result of the rotation of the drums, this liquid is carried along upward in the troughs. When a trough is moving upward, the liquid runs out of it, and if this trough has moved high enough, it will be drained completely. The liquid from the trough drops onto the solid matter which is continually moved by a screw in the inner drum.

The liquid is flowing below between the drums in a direction opposite to the direction of movement of the solid matter, this also due to said screw blade.

When a trough becomes filled, the solid matter situated above, due to its weight, exerts a pressure, and together with the liquid in many cases a quantity of liquid matter will penetrate through the perforations in the inner drum into the trough.

When the liquid flows off the trough through the inner drum, this takes place solely under the influence of gravity, and it was noted that a portion of this solid matter which has penetrated into a trough remains in said trough.

As a consequence, after a period of time the troughs will fill with solid matter, as a result of which they can take up less liquid and, thus, the efficiency of the exchange of matter or energy strongly diminishes.

The invention has as an aim to remedy this disadvantage and to provide for a device for the transfer of energy and/or matter between a solid matter and a liquid, in which it is prevented in a simple manner that the troughs gradually fill up with solid matter.

According to the invention, this aim is achieved in that the inner drum, along that rim of each trough which is situated in front seen in the rotational sense of the drum, is provided with at least one drain opening which is larger than the perforations of the inner drum, whereby opposite to said drain opening, means are provided for, when the drain opening is downside during the rotation of the drums, preventing the penetration of solid matter therethrough but which, during the pouring of liquid off the trough, allow for that the liquid is flowing off therethrough practically unhampered, together with solid matter possibly prevailing in the trough.

The return flow of the liquid from the troughs takes place substantially or even entirely through the drain opening and no longer through the perforations of the inner drum. As this drain opening is much larger than the perforations, this draining takes place easily and fast, such that practically all solid matter from the trough is carried along by the draining liquid or drops through the drain opening due to gravity.

Said means can be stationary in respect to the inner drum and, for example, may comprise a cap which partially is situated in the inner drum opposite to the drain opening.

When the opening is situated at the bottom and, thus, solid matter is thereabove, said portion of the cap also is situated above the opening, such that the solid matter might pass through the opening only by means of a zigzag movement. In the draining position of the trough, the cap forms a kind of pouring spout which guides the liquid.

In another form of embodiment of the invention, these means comprise a flap which can be hinged towards the inside of the inner drum which, in closing position, closes off the drain opening.

When the drain opening is situated below, the flap is in closing position. When, during the rotation of the drums, the flap becomes situated higher and above the solid matter, it swings open due to gravity, and the liquid and, possibly, solid matter can pass outward through the opening.

Between the two drums, means, such as a screw, can be present for moving the liquid in the opposite sense of movement of the solid matter; however, the space between the drums can be divided into sections by means of radial partitions, with in each section a number of troughs distributed over the periphery of the inner drum.

For the flow of liquid from its supply at one extremity of the inner drum towards the other extremity, in these radial partitions, at the location of each trough, at least one opening may be provided, such that, when the trough is situated below, the liquid can flow through such opening to a trough of the adjacent section.

At the extremity of the drums where the solid matter is supplied, means can be provided for filtering the liquid which is drained, which means, for example, consist of a bucket wheel with perforated partitions which is attached around a supply channel for the solid matter in respect to the inner drum, which bucket wheel, in between the partitions, is open at that side of the supply channel which, at the top, is provided with a collecting funnel for the solid matter.

With the intention of better showing the characteristics of the invention, hereafter, as an example without any limitating character, several preferred forms of embodiment of a device for the transfer of energy and/or matter between a solid matter and a liquid according to the invention are described, with reference to the accompanying drawings, wherein.

Figure 1:
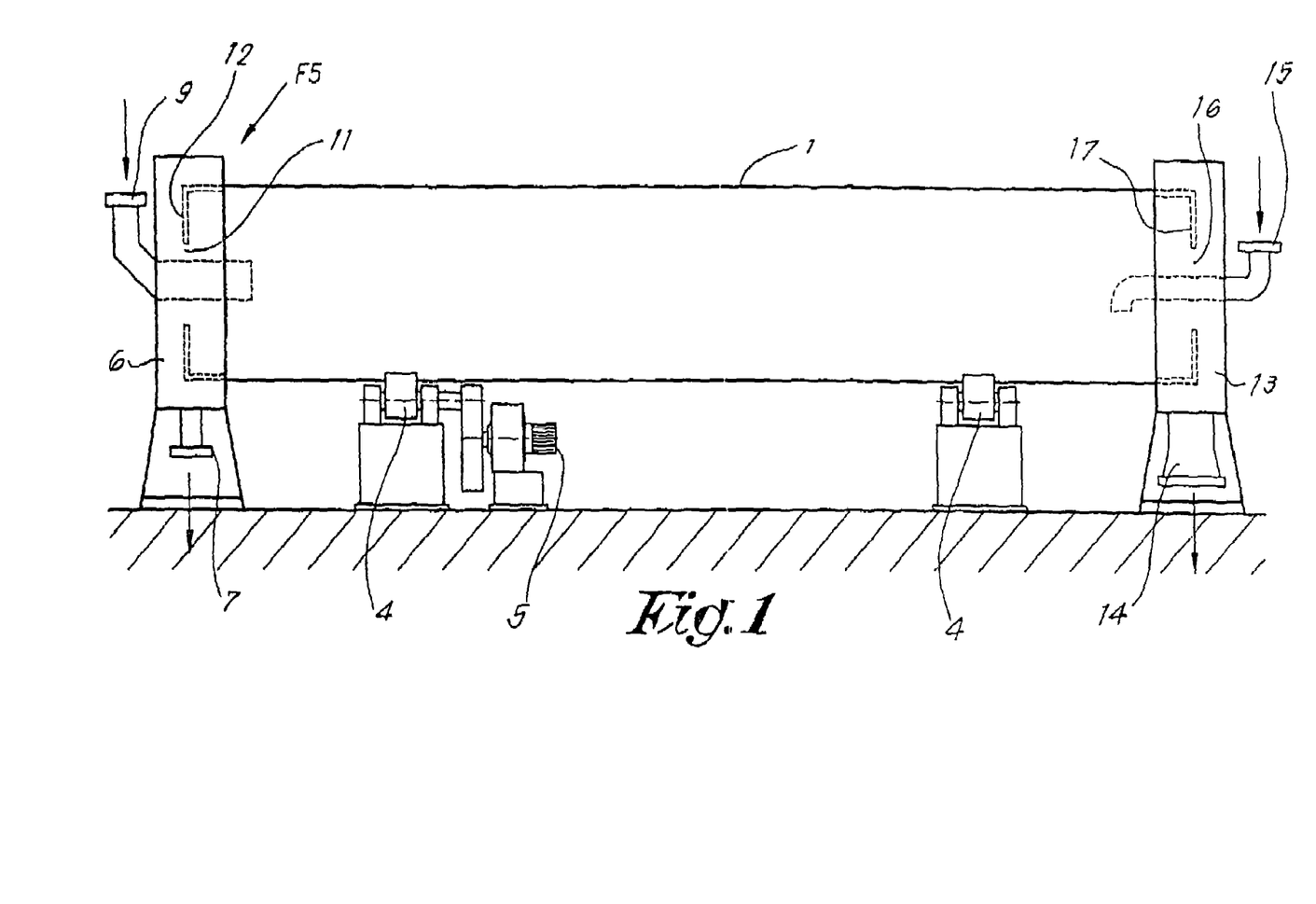
FIG. 1 schematically represents a side view of a device according to the invention.
Figure 2:
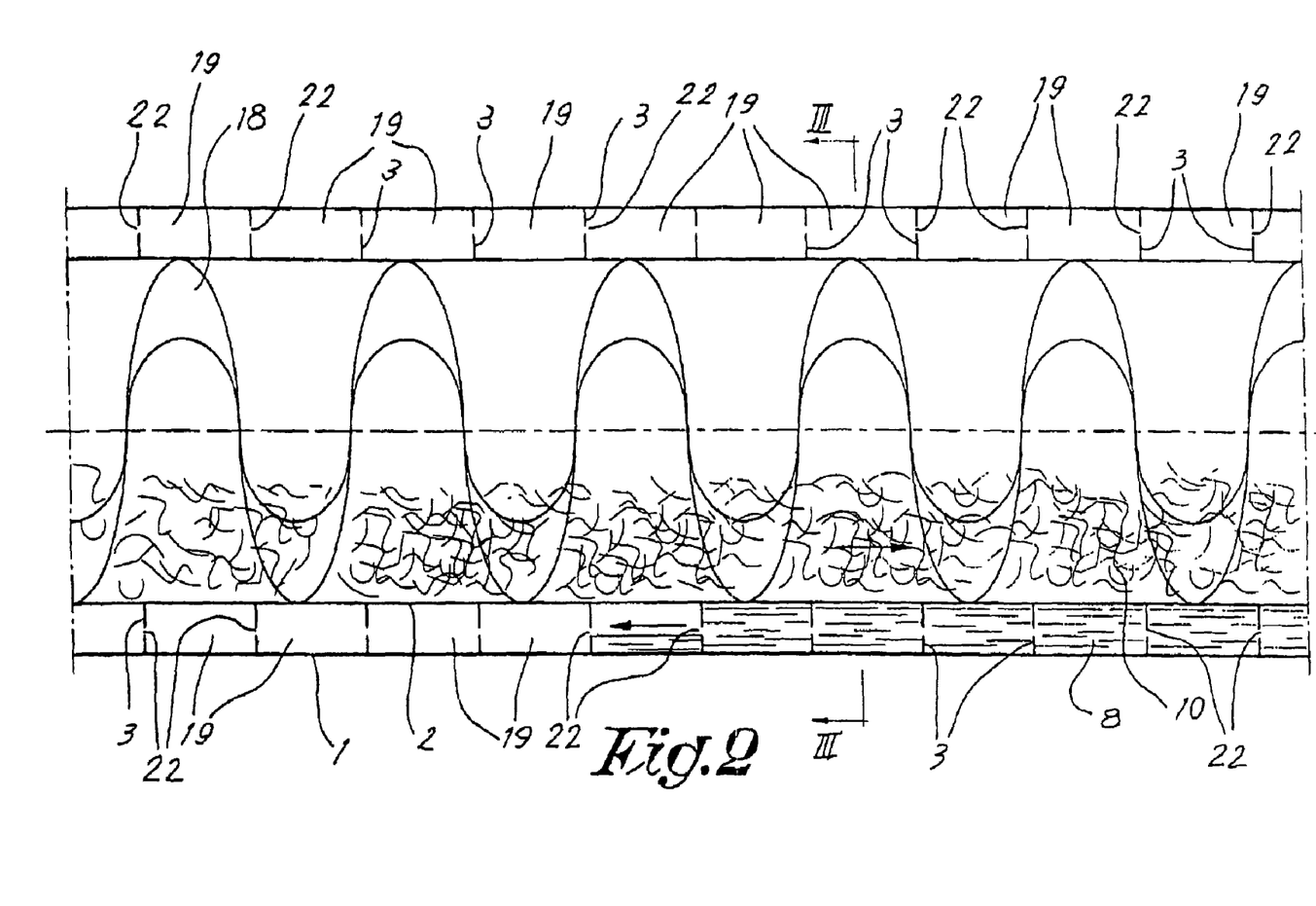
FIG. 2 schematically represents a longitudinal section of the central part of the device of FIG. 1.

As represented in FIGS. 1 and 2, the device according to the invention comprises a cylindrical outer drum 1, which is mounted in lying position, and a coaxial, perforated inner drum 2 which is attached to the outer drum 1 by means of radial partitions 3.

For simplicity's sake, the perforations of the inner drum 2 are not represented in FIG. 2.

The outer drum 1 is supported by wheels 4, of which wheels at least one is driven by a motor 5 which forms means for revolving the drum 1 around its axis.

With its one extremity, the outer drum 1 gives out in a fixedly installed chamber 6 which at the bottom is provided with an outlet 7 for the liquid 8.

Through that chamber 6, a supply channel 9 for the solid matter 10 is extending which, through a central opening 11 in an end wall 12 of the drum 1, gives out axially into the inner drum 2, as will be described more in detail in the following.

With its other extremity, the drum 1 protrudes into a fixedly installed chamber 13 which at the bottom is provided with an outlet 14 for the solid matter 10.

A supply conduit 15 for the liquid 8 extends through this chamber 13 and a central opening 16 in the end wall 17 of the drum 1 up to inside the inner drum 2.

As represented in detail in FIG. 2, a screw blade 18 is installed in the inner drum 2, which screw blade is attached, for example, welded, with its edge to the inner drum 2.

Said radial partitions 3 divide the space between the two drums 1 and 2 into ring-shaped sections 19.

In each section 19, distributed over the periphery of the inner drum 2, in between the partitions 3, furthermore partitions 20 extending in axial direction are provided which are attached to the outer drum 1 as well as to the inner drum 2.

Figure 3:
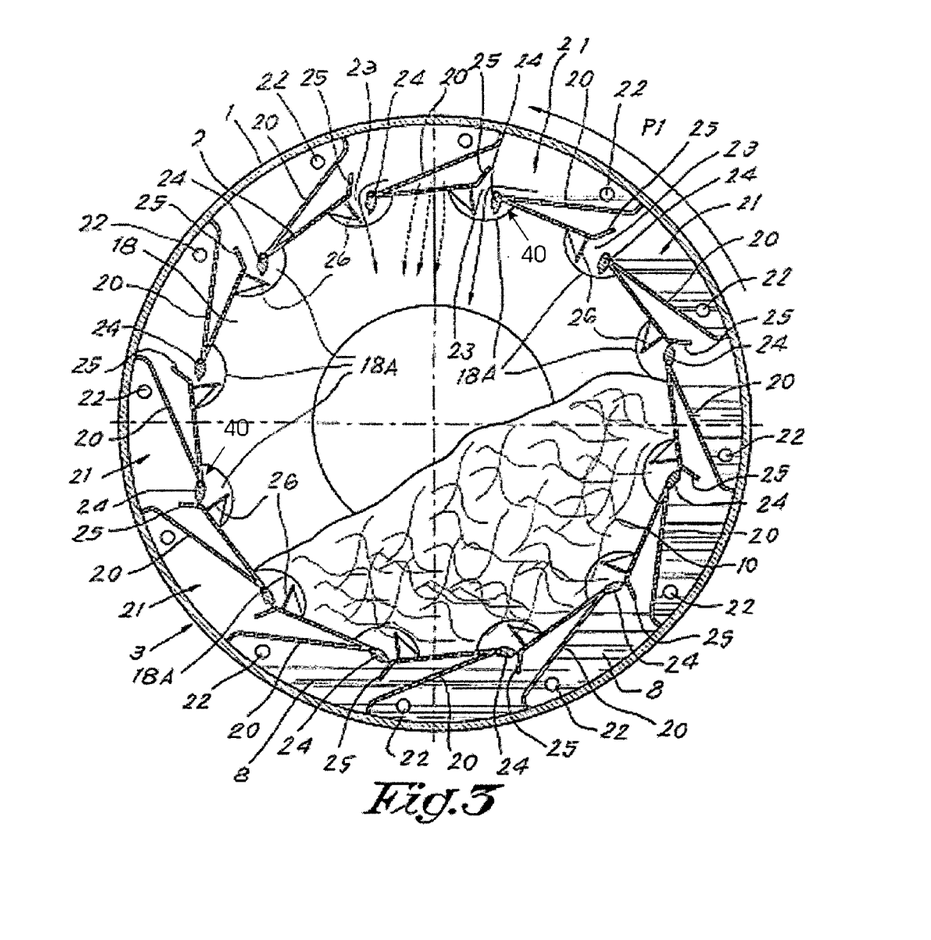
FIG. 3 represents a cross-section according to line III—III in FIG. 2, drawn at a larger scale.

As represented in detail in FIG. 3, these partitions 20, in respect to the rotational sense of the drums 1 and 2 which in this figure is represented by arrow P1, substantially are directed towards the inner drum 2 in movement direction.

Together with parts of two radial partitions 3 and parts of the outer drum 1, the partitions 20 form troughs 21 for lifting liquid 8 in a section 19.

In both end walls of each trough 21, formed by a portion of a radial partition 3, an opening 22 is provided in the proximity of the outer drum 1 which forms a passage to an adjacent trough 21 of an adjacent section 19.

Directly in front of each partition 20, viewed in the direction indicated by arrow P1, a drain opening 23 is provided in the inner drum 2, in the shape of a slot which extends between the two partitions 3 at the extremity 40 of a trough 21 in the longitudinal direction of the inner drum 2 and which can be closed off by a flap 24 which can be swung open towards the inside of the drum 2.

For simplicity's sake, these drain openings 23 are not represented in FIGS. 1 and 2.

The hinge axis of a flap 24 is situated at the edge of a drain opening 23 which, viewed in the rotational sense of the drum 2 indicated by arrow P1, is the foremost edge of this drain opening 23 and coincides with the edge of a partition 20.

At the opposed edge of the drain opening 23, on which the edge of the flap 24 in closed position is resting, there is an upstanding edge 25 directed towards the outer drum 1 for guiding the liquid, and an edge 26 directed towards the inside of the inner drum 2 for protecting the flap 24.

Between the drain openings 23, the inner drum 2 is flat, such that in fact it forms a polygon.

In order not to hamper the swinging open of the flaps 24, the screw blade 18 to this end is provided with cutouts 18A.

Figure 5:
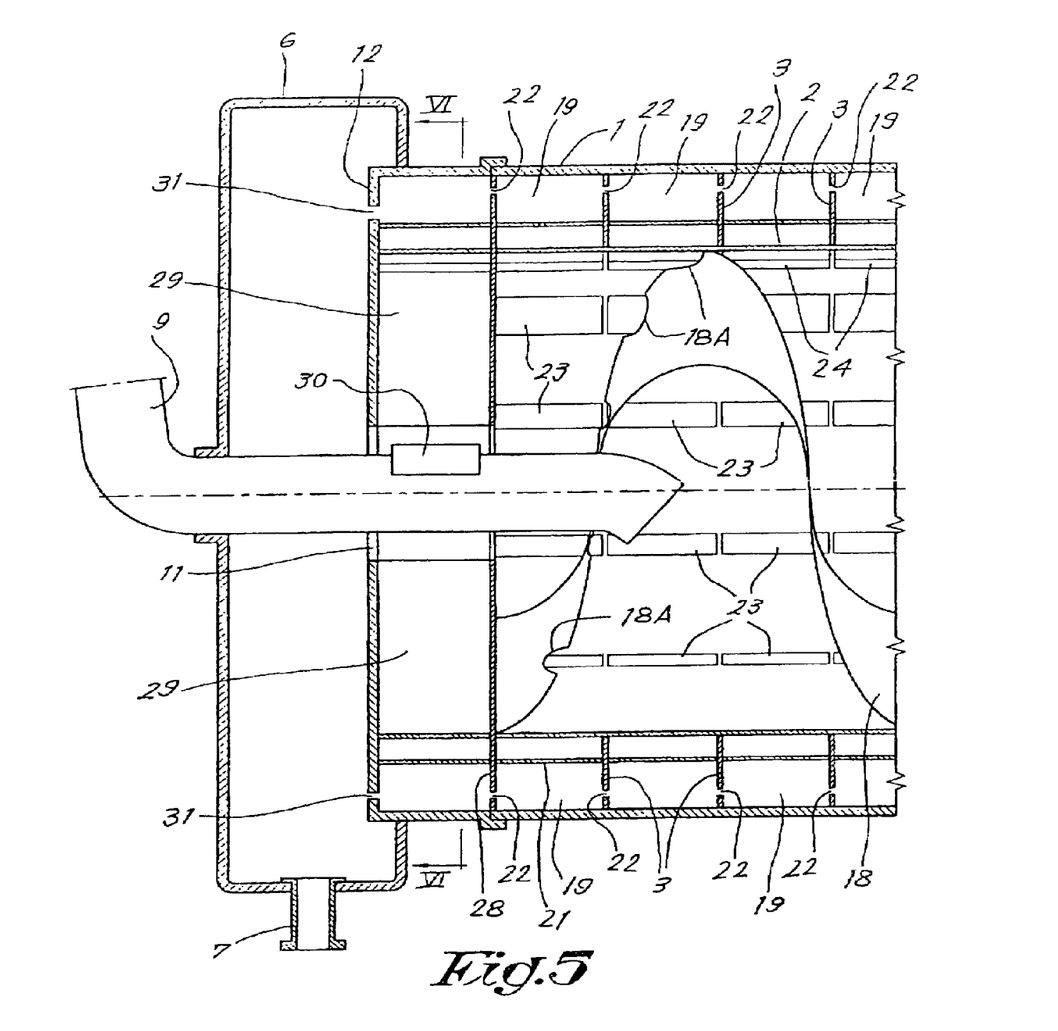
FIG. 5 at a larger scale represents a longitudinal section of the part indicated by F5 in FIG. 1.
Figure 6:
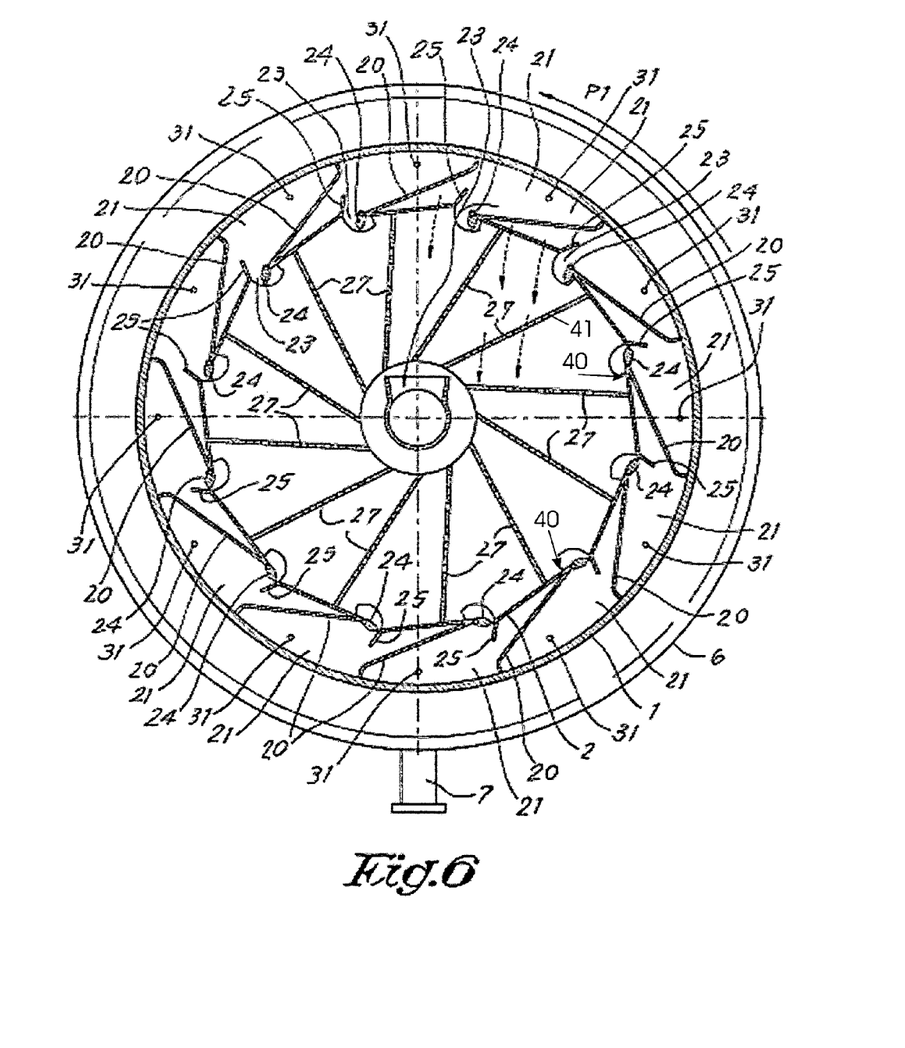
FIG. 6 represents a cross-section according to line VI—VI in FIG. 5.

As represented in FIGS. 5 and 6, opposite to the last section 19, in the proximity of chamber 6, the screw blade 18 in the inner drum 2 is replaced by a bucket wheel 41 with a number of perforated partitions 27 which is attached between the end wall 12 and a perpendicular wall 28, situated in the prolongation of the last radial partition 3 in the inner drum 2, which freely surrounds the supply channel 9 for the solid matter 10.

The partitions 27 are perforated in the same manner as the inner drum 2 and extend from against the inner drum 2 up to opposite the inner edge of the perpendicular wall 28 and, thus, up to a distance from the supply channel 9, possibly such as represented, at an angle in respect to the radial.

At the extreme end of each compartment 29, formed in between two adjacent partitions 27, a drain opening 23 is giving out, whereas each compartment is open at the side of the supply channel 9.

The partitions 27 form means for filtering the liquid 8 before said liquid leaves the drums 1 and 2.

Opposite to these partitions 27, a funnel-shaped orifice element 30 is provided at the upper side of the supply channel 9, which element gives out to the inside of the supply channel 9.

The functioning of the device is as follows.

Solid matter 10 comprising matter dissolvable in the liquid 8 is brought, through supply channel 9, into the inner drum 2, in which, by the revolutions of drum 2 and screw blade 18, it is moved to the opposite extremity in order to be collected there in chamber 6 and to be transported off through outlet 7.

The liquid 8, which forms a dissolvent for said matter, is poured at the last-mentioned extremity, through supply conduit 15, onto the solid matter 10 in the inner drum 2.

Said liquid 8 seeps through the solid matter 10, dissolves matter and, through the perforations of the inner drum 2, is collected in the troughs 21 situated below.

Part of the liquid 8 is flowing below, through openings 22, towards troughs 21 of a subsequent section 19. The undrained liquid 8 in a trough 21 is carried along upward by the rotation of the drums 1 and 2 and subsequently is poured out again onto the solid matter 10 in the manner described hereafter, which matter, as a consequence of the continuous movement, already is another mass of said solid matter 10.

When a flap 24 during the rotation of the drums 1 and 2 is situated on top, it is suspended in open position due to gravity. When it is moved downward, it will swing shut due to gravity and will be in closing position even before it gets below the solid matter 10 in the inner drum 2.

The weight of the solid matter 10 also keeps the flap 24 in closed position.

As a result of this flap 24 being in closing position, no solid matter 10 can penetrate through the drain opening 23 into the corresponding trough 21.

When the flap 24, when the drums 1 and 2 are rotated further, reaches a well-defined height and the solid matter 10 no longer prevents the swinging open, the flap 24, under the influence of gravity, will swing open.

The shape of the partitions 20 is such that only after the opening of drain opening 23 by tilting the flap 24, liquid 8 is poured out of a trough 21, such that it substantially flows off the trough 21 through the opened drain opening 23, which can take place with a larger flow than through the perforations of the inner drum 2.

Thereby, edge 26 guides the liquid towards drain opening 23.

Together with said flow, or subsequently, due to the relatively large drain opening 23 also possible solid matter 10 which, also under the influence of the pressure of the solid matter 10, has penetrated below through the perforations of the inner drum 2, is removed from the trough 21.

This means that, while the liquid 8 is flowing through openings 22 into the direction of chamber 13, in each section 19 a portion of this liquid is brought upward by the troughs 21 and again is poured, through a drain opening 23, onto the solid matter 10, more particularly onto a new quantity of the moving solid matter 10.

In this manner, the liquid 8 continuously is enriched with the matter which is dissolved from the solid matter 10.

Before the liquid 8 leaves the drums 1 and 2, it is filtered through the perforated partitions 27.

The liquid 8 which is brought upward by the troughs 21 from the bottom of the last section 19 and is poured through the inner drum 2, now drops into a compartment 29 formed in between two partitions 27 and, more particularly, onto the lowermost partition 27 bordering such compartment 29.

The liquid 8 penetrates through the perforations of this partition 27, whereas the possible solid matter 10 therein is held back by said partition 27.

The liquid 8 flows through partitions 27 up to the bottom, and, through openings 31 provided in the end wall 12, liquid 8 flows over to chamber 6, from where it is drained through outlet 7.

When compartment 29 is at the top, then the solid matter 10 held back on the partitions 27 drops through the opening of said compartment 29 into the orifice element 30 and thus is added to the supplied solid matter 1.

Figure 4:
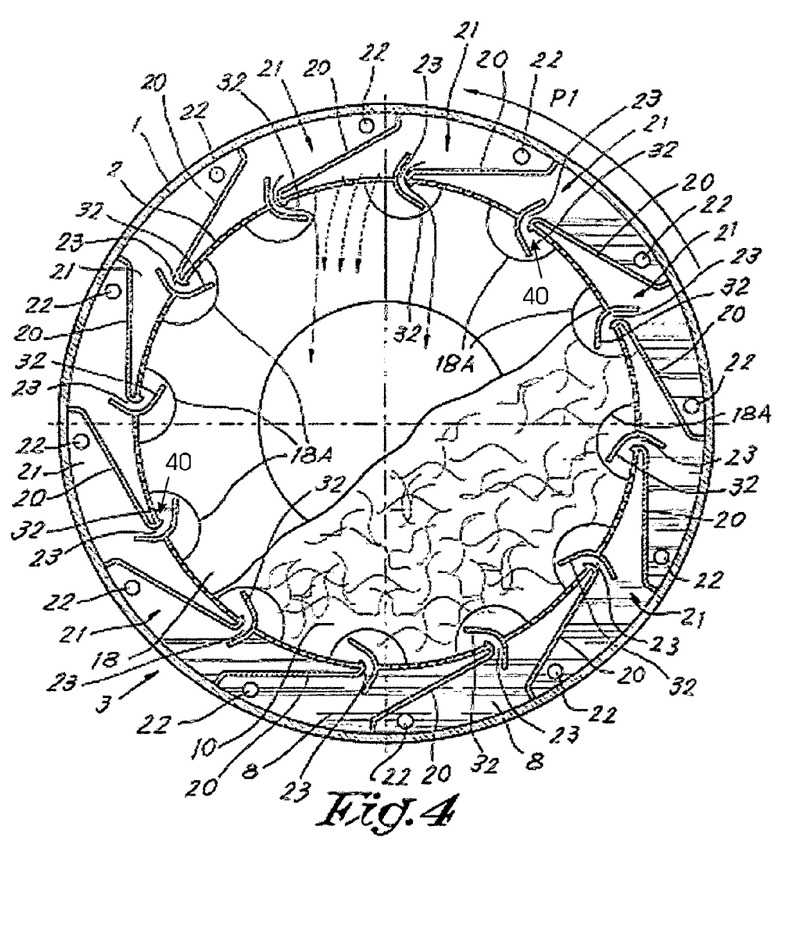
FIG. 4 represents a cross-section analogous to that of FIG. 3, however, relating to another form of embodiment of the device according to the invention.

In a variant, the flaps 24 at the drain openings 23 are replaced by caps 32, as represented in FIG. 4.

The two lateral surfaces of each cap 32 define an angle with each other of somewhat more than 90°. In the proximity of its rounded top, the cap 32 is fixed to the inner drum 2 at the edge, situated foremost in the direction of rotation, of the drain opening 23, and viewed in radial direction, the lateral surface situated in the inner drum 2 completely covers the drain opening 23.

The edge of each partition 20 which is connected to the inner drum 2 can be rounded and reach up into said drum 2 in order to guide the poured liquid 8 and to prevent that said liquid flows along the wall of the drum 2.

The caps 32 perform the same function as the flaps 24 in that sense that, when the drain opening 23 is positioned at the bottom, they prevent the solid matter 10 from entering said opening.

At the bottom, the cap 32 is situated vertically above the drain opening 23, such that the solid matter 10 has to perform a zigzag movement in order to reach the drain opening 23 by passing below the cap 32.

The higher the cap 32 is positioned, the more it tilts, such that, together with the rounded edge of the partition 20, it forms a pouring spout for draining the liquid 8 off the trough 21.

By using flaps 24 as well as caps 32, the agglomeration of solid matter 10 in the troughs 21 is prevented.

The device can, for example, be used for transferring sugar from beet root pulp to water. Whereas the pulp gradually contains less sugar, the water flowing in the other direction gradually will contain more sugar.

Other substances can be treated with possibly other dissolvants than water.

In the same manner, instead of matter, thermal energy or heat can be transferred from a solid matter to a liquid or reverse, such that the device serves as a heat exchanger.

The partitions 20 in adjacent sections 19, viewed in peripherical direction, can be staggered in respect to each other.

The space between the outer drum 1 and the inner drum 2 does not necessarily have to be divided in sections 19 by radial partitions 3.

Instead, the two drums 1 and 2 can be connected to each other by one or more screw blades, the turns of which preferably are positioned in opposite sense to those of the screw blade 18, such that below, they move the liquid 8 in opposite direction in respect to the solid matter 10. Then, the partitions 20 can be provided between successive turns of the screw blade in between the drums 1 and 2.

The drums 1 and 2 also do not have to be positioned perfectly horizontal. In order to increase the transport of the liquid 8, they also can be disposed somewhat downwardly inclined in the direction of movement of liquid 8.

The invention is in no way limited to the forms of embodiment described in the aforegoing and represented in the figures, on the contrary may such device be realized in different variants while still remaining within the scope of the invention.

The invention claimed is:

1. Device for the transfer, between a solid matter and a liquid, of energy and/or matter dissolvable in the liquid, which device comprises an outer drum mounted in lying position, an inner drum which is provided with perforations and which is situated coaxially in the outer drum and is connected to this latter, means for commonly rotating the two drums, and means situated inside the inner drum for moving the solid matter from a supply at one extremity of said drum to an outlet at its other extremity, whereby in between the two drums a number of troughs are formed, each trough running in a longitudinal direction of the inner drum and having a rim at the leading edge of said trough in the rotational sense of the drum, said troughs, during the rotation of the drums, scooping up liquid from beneath between the drums and bringing the liquid upward and further up pouring out said liquid through the inner drum onto the solid matter inside the inner drum, wherein the inner drum, at a position along the rim of each trough, is provided with at least one drain opening which is larger than the perforations of the inner drum, whereby opposite to said drain opening, means are provided for preventing, when the drain opening is at the bottom of the drums during the rotation of the drums, the penetration of solid matter therethrough but, during the pouring of liquid off the trough at the top of the drums allows for the unhampered flow of the liquid therethrough, together with solid matter wherein said means for preventing the penetration of solid matter through said drain opening comprising a flap hinged towards the inside of the inner drum, which flap, in closing position, closes off the drain opening.

2. Device according to claim 1, wherein said means for preventing the penetration of solid matter through said drain opening are stationary with respect to the inner drum.

3. Device according to claim 2, wherein said means for preventing the penetration of solid matter through said drain opening consist of a cap which is partially situated in the inner drum opposite to the drain opening.

4. Device according to claim 1, wherein the space between the drums is divided into sections by radial partitions, and within each section a number of troughs are distributed over the periphery of the inner drum.

5. Device according to claim 4, wherein the troughs in each section are formed by partitions extending between two radial partitions.

6. Device according to claim 4, wherein at least one opening is provided in the radial partitions, at the location of each trough.

7. Device according to claim 1, wherein, at the extremity of the drums where the solid matter is supplied, means are provided to filter the liquid which is drained.

8. Device according to claim 7, wherein said means for filtering includes a bucket wheel with perforated partitions which, in respect to the inner drum, is attached around a supply channel for the solid matter, which bucket wheel, in between the partitions, is open at the side of the supply channel, which latter, at the top, is provided with an orifice element for collecting the solid matter.

9. Device according to claim 1, wherein the means for moving the solid matter in the inner drum comprise a screw blade.

10. Device according to claim 9, wherein said screw blade is fixed in respect to the drums.

* * * * *